(No Model.)
A. J. NELLIS.
MEANS FOR SECURING THE TEETH OF HORSE HAY RAKES, &c.
No. 328,508. Patented Oct. 20, 1885.
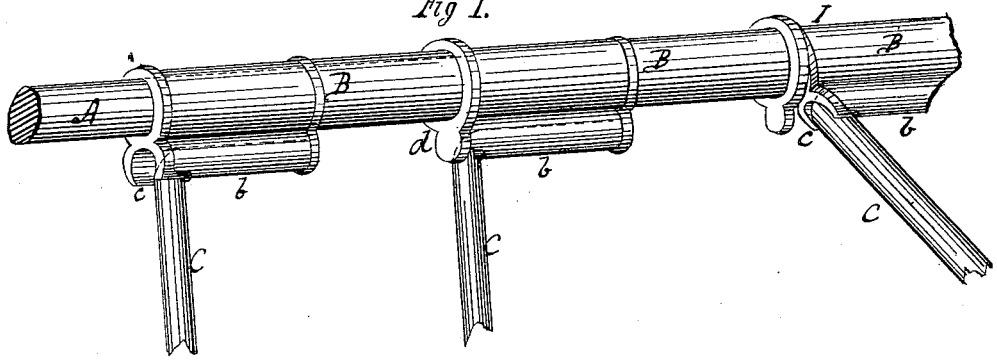
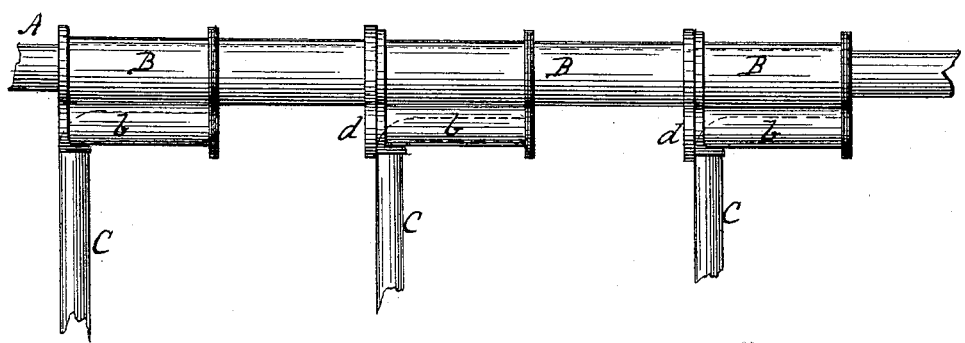
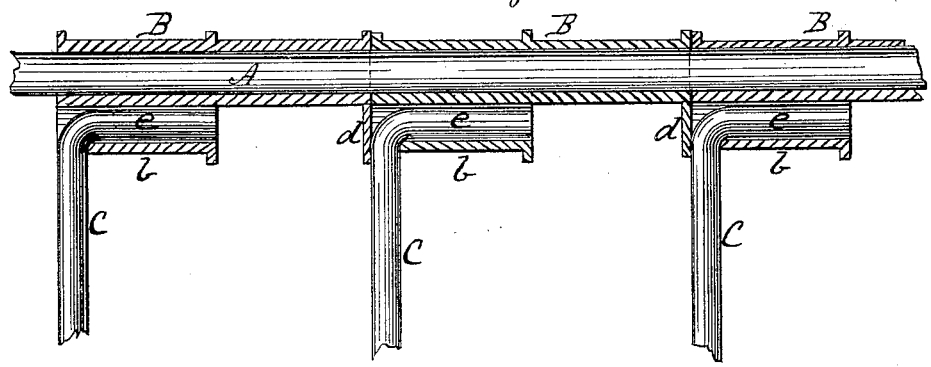
Witnesses
G. A. Tauberschmidt
[signature]
Inventor.
Aaron J. Nellis
by F. W. Ritter Jr
atty

UNITED STATES PATENT OFFICE.

AARON J. NELLIS, OF PITTSBURG, PENNSYLVANIA.

MEANS FOR SECURING THE TEETH OF HORSE HAY-RAKES, &c.

SPECIFICATION forming part of Letters Patent No. 328,508, dated October 20, 1885.

Application filed April 28, 1884. Serial No. 129,609. (No model.)

*To all whom it may concern:*

Be it known that I, AARON J. NELLIS, a citizen of the United States, residing at Pittsburg, in the county of Allegheny and State of Pennsylvania, have invented certain new and useful Improvements in Means for Securing the Teeth of Horse Hay-Rakes and Like Articles; and I hereby declare the following to be a full, clear, and exact description of the same, reference being had to the accompanying drawings, in which—

Figure 1 is a perspective view of devices embodying my invention. Fig. 2 is a plan view, and Fig. 3 is a sectional view.

Like letters of reference indicate identical parts in all the figures.

This invention relates to that class of rake-teeth wherein the tooth is secured to a spool, which is strung upon a rod or in similar manner secured to the rake-head.

The object of the present invention is to provide means whereby any tooth of the series may be readily removed and replaced without disturbing the other spools or teeth of the series; and to this end it consists, mainly, in providing the spool with a socket for the reception of the end of the tooth, into which the tooth may be inserted upon rotating the spool, and in which it is held by a suitable keeper, which is brought in line with the socket when the spool resumes its former position; and, secondarily, in a spool having a tooth-socket upon one end and a keeper on the opposite end, as will hereinafter more fully appear.

I will now proceed to describe my invention more specifically, so that others skilled in the art to which it appertains may apply the same.

In the drawings, A indicates the usual rod upon which the tooth-spools are strung, and B the spools or thimbles. These spools or thimbles I form with a socket, $b$, which will be of such diameter as to receive the rake-tooth, and may be arranged parallel to the axis of the spool, and slotted, as at $c$, to permit the tooth, when in place, to project at right angles to the thimbles. On the opposite end of the spool B is formed a projecting lug or flange, $d$, in line with the socket $b$, which lug or flange serves as a keeper for the tooth held in the socket $b$ of the adjoining spool B.

Instead of the keeper $d$ being formed on the thimble or spool B, an independent keeper may be employed, as, for instance, the slot $c$ may be made deeper and closed at its outer end by a pin or screw. The simplest construction, however, and that preferred by me, is that shown in the drawings.

The tooth C has its end $e$ bent at right angles to form the pintle which is to enter socket $b$.

In applying the devices, the spools or thimbles B are strung on rod A, with the keeper $d$ of one spool next to the socket $b$ of the adjacent spool, and the teeth are attached by rotating the spool, as shown at $l$ Fig. 1, inserting the pintle $e$ in socket $b$, and permitting the spool to return to its former position, as shown in Figs. 2 and 3, which will bring the socket $b$ opposite the keeper $d$ of the adjacent spool, and prevent the escape of the tooth.

The teeth will be held in the position shown in Fig. 2 by the usual spring-bar, which when in use will not yield sufficiently to permit such independent motion of one spool as will allow the socket thereof to rise above the keeper of the adjacent spool, so that the tooth can escape.

When a tooth is to be removed, the spring may be overcome and the spool may be readily rotated by using the tooth as a lever, so as to bring the socket $b$ above the keeper $d$, which will permit the tooth C to be withdrawn and another tooth inserted.

A thimble or spool of the character herein described can be used with any rake at present constructed with spools and rods for securing the teeth to the rake-head, and is therefore a distinct article of manufacture and trade.

Having thus described my invention, what I claim, and desire to secure by Letters Patent, is—

1. A spool for securing the tooth of a horse hay-rake, said spool having a tooth-socket at one end and a keeper at the opposite end and in line with the socket, substantially as and for the purpose specified.

2. A spool for securing the tooth of a horse hay-rake having a tooth-socket parallel with its axis, said socket slotted to permit the tooth to project at right angles to the spool, substantially as and for the purposes specified.

3. The combination of a spool having a parallel tooth-socket, a tooth having a pintle which projects at right angles, and a keeper arranged in line with the socket for preventing the escape of the pintle from the socket of the spool, substantially as and for the purposes specified.

In testimony whereof I affix my signature in presence of two witnesses this 26th day of April, 1884.

AARON J. NELLIS.

Witnesses:
L. G. BARTON,
JOHN BURTON.